May 15, 1923. 1,454,996
T. A. ERRETT ET AL
CUTTING AND WELDING TORCH
Filed Oct. 21, 1921 2 Sheets-Sheet 1
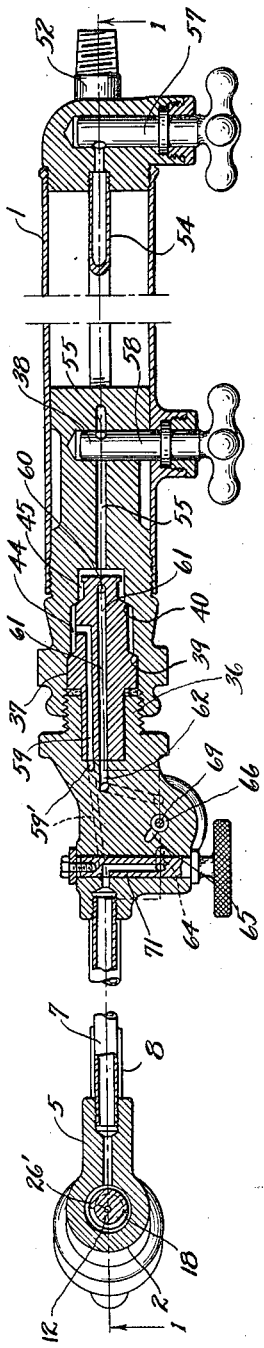
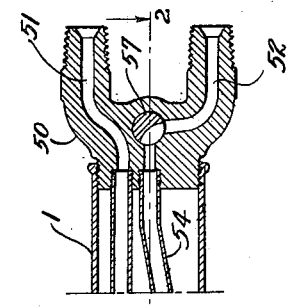
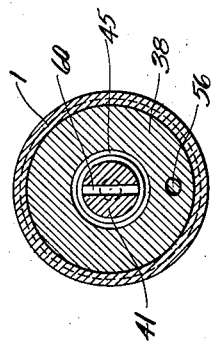
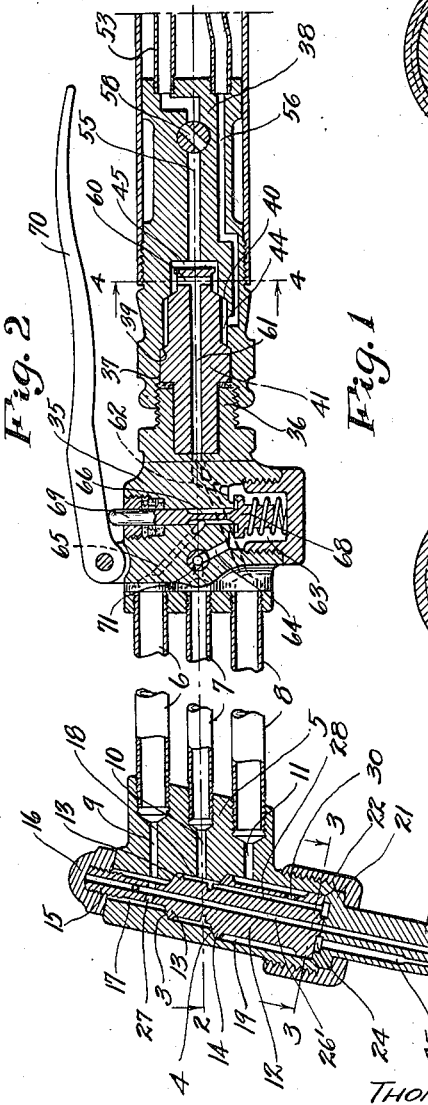
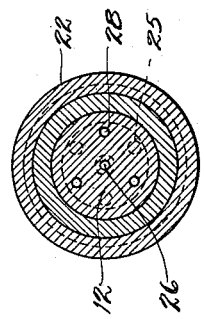
Inventor
THOMAS A. ERRETT
WILLIAM P. BROWN
Attorney HUGH F. BROWN
By
Richard J. Cook

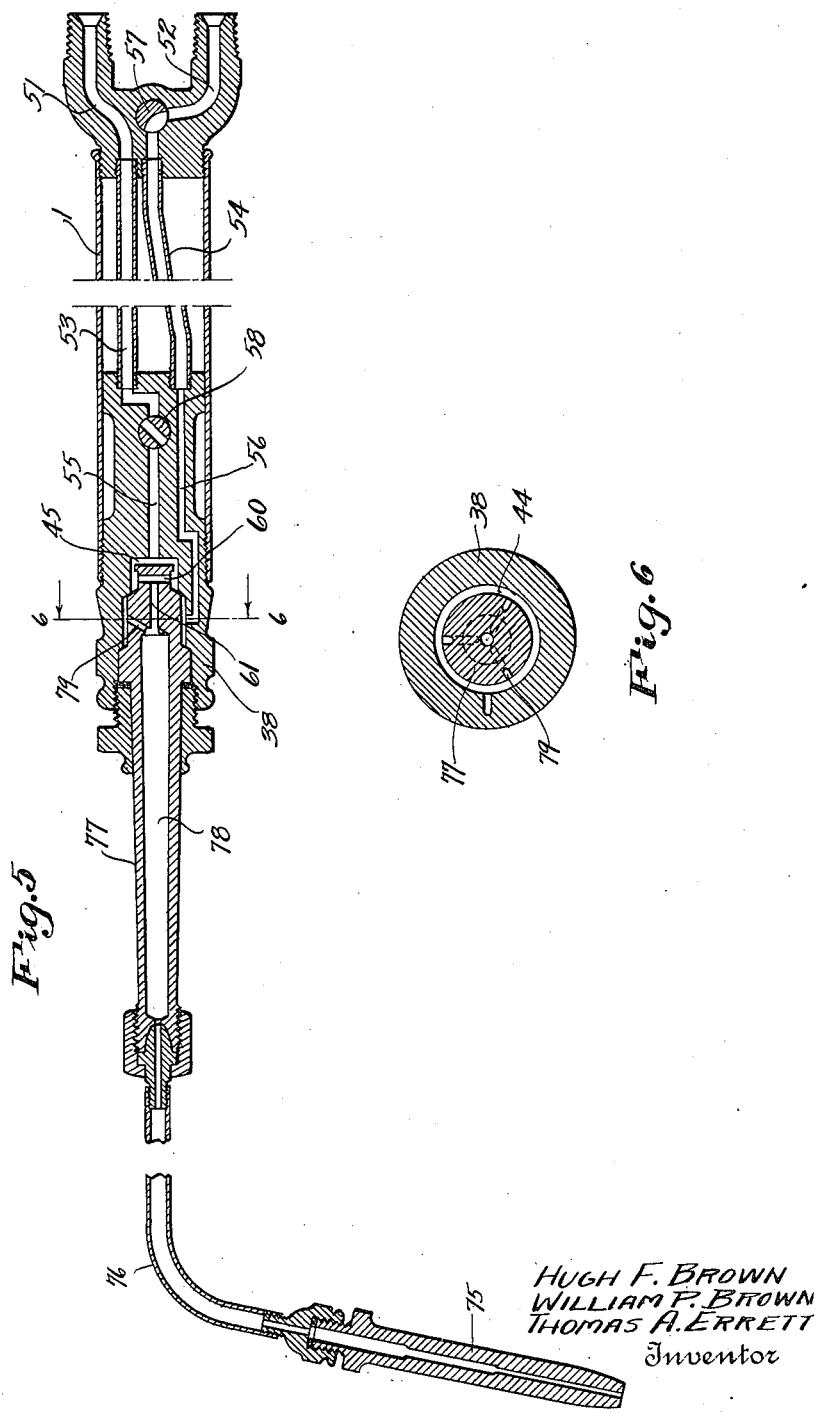

Patented May 15, 1923.

1,454,996

UNITED STATES PATENT OFFICE.

THOMAS A. ERRETT, WILLIAM P. BROWN, AND HUGH F. BROWN, OF SAN FRANCISCO, CALIFORNIA.

CUTTING AND WELDING TORCH.

Application filed October 21, 1921. Serial No. 509,295.

*To all whom it may concern:*

Be it known that we, THOMAS A. ERRETT, WILLIAM P. BROWN, and HUGH F. BROWN, citizens of the United States, and residents of San Francisco, California, have invented certain new and useful Improvements in Cutting and Welding Torches, of which the following is a specification.

This invention relates to improvements in welding torches, and more particularly to torches of that character which utilize oxygen and acetylene gases, to produce a welding, or cutting flame. The principal object of the present invention is to provide a welding torch of the above character embodying improvements of construction, whereby, should explosions take place due to a flash back within the mixing chambers of the torch, the force of such explosion, which would normally tend to blow inwardly and drive the flame to the gas supply tubes, is so overcome and resisted that its force is expended to drive the flame outwardly.

Other objects of the invention reside in the details of construction, and in the combination of parts hereinafter described.

In accomplishing these and other objects of the invention, we have provided the improved details of construction, the preferred forms of which are illustrated in the accompanying drawings, wherein—

Fig. 1 is a longitudinal, sectional view of a torch constructed in accordance with the present invention; the view being taken on the line 1—1 in Fig. 2.

Fig. 2 is a longitudinal section of the torch, taken on the line 2—2 in Fig. 1.

Fig. 3 is an enlarged, transverse section, taken on the line 3—3 in Fig. 1.

Fig. 4 is a transverse sectional view on the line 4—4 in Fig. 1.

Fig. 5 is a longitudinal section of a torch of a modified construction but also embodying the principal feature of the present invention.

Fig. 6 is a transverse section, taken on the line 6—6 in Fig. 5.

Referring more in detail to the several views of the drawings, wherein like reference numerals designate the same or like parts—

1 designates the handle end of the torch casing wherein is embodied a passageway for the pipes through which the different gases used are conveyed to the head of the torch. The head, which is designated at 2, comprises a cylindrical body cored out to provide a passageway longitudinally therethrough. This passageway comprises three parts of different diameters, and contains two outwardly facing annular seats 3 and 4. A lateral flange 5 formed integral with the head serves as a connecting means for the respective pipes 6, 7 and 8 which are threaded in to the flange in registration respectively with channels 9, 10 and 11 which communicate with the internal chamber of the head.

Inserted within the head is an elongated plug 12, provided with annular shoulders 13 and 14 which are adapted to seat against the seats 3 and 4, and also having a threaded end portion 15 which extends from the top of the head and has a cap 16 thereon whereby the plug shoulders are drawn tightly against the seats to preclude leakage. At its lower end, the plug fits snugly within the chamber, and intermediate this lower end and the shoulder 14, also between the shoulders 13 and 14 and above the upper shoulder, it is reduced in diameter so that three separate annular chambers 17, 18 and 19 are formed which have communication respectively with the pipes 6, 7 and 8 through the channels 9, 10 and 11.

Disposed in abutting contact with the lower end of the plug 12 is a tip 20, consisting of a nozzle like member with a projecting annular flange 21 about its upper end. A union coupling 22, which encloses the flanged end of the tip, is threaded onto the lower end of the head 2 to secure the tip functionally in position. The tip shown is provided with a central extension, on its inner end, that is seated within a socket provided in the lower end of the plug, and an annular channel 24 is formed about this extension between the tip and plug from which a plurality of outlet channels 25 lead to the end of the tip. There is also a central channel 28 through the tip which registers with a central channel 26' in the plug 12. This latter channel has outlet ports 27 near its upper opening into the chamber 17, and there are channels 28 extending longitudinally within the lower end of the plug which provide communication between the chambers 18 and 24. Also, ports 30 are formed in the lower portion of the plug to provide communication between the chamber 19 and channels 28.

The inner ends of the pipes 6, 7 and 8 are mounted within a valve casting 35 which, in turn, has a neck portion 36 threaded into the outer end of a cored out chamber 37 in a casting 38 mounted within the outer end of the handle member 1. The chamber 37 has two annular outwardly facing seats 39 and 40 formed therein and a plug 41 is mounted within a bore in the neck portion of the member 35 and the chamber 37 which has shoulders formed thereon to engage the said seats 39 and 40 so that there is provided an annular chamber 44 about the plug and a separate pocket 45 at the base of the chamber, into which the inner end of the plug extends.

At the inner end of the handle member 1 is a casting 50, provided with two channeled stems 51 and 52 which are adapted to be connected respectively with conduits, not shown, leading from a supply of oxygen gas and acetylene gas under pressure. Pipes 53 and 54 lead from these channels within the handle 1 to the end of the casting 38 where they are connected with channels 55 and 56 within the latter and which lead respectively into the pocket 45 and chamber 41. A valve 57 is located in the channel 52 and a valve 58 is placed in the channel 55 whereby the flow of gases is controlled. A channel 59 is formed in the plug 41, see Fig. 2, which opens at one end into the chamber 44 and at its opposite end registers with a channel 59' in the casting 35 which leads into the pipe 8.

One of the features of the present device resides in the construction of the plug 44, which is of such length that it does not reach to the base of the pocket 45. There is a channel 60 transversely through this inner end of the plug and a channel longitudinally of the plug which, at one end, opens into the channel 60 and at its opposite end into a channel 62 which leads into a valve chamber 63 in the casting 35. A passage 64 leads from the chamber 63 into the pipe 7 and a passage 65 provides communication between the pipe 6 and a valve stem channel 66 which opens into the chamber 63. The channel 66 is normally closed by means of a spring pressed valve 68 having a stem 69 extending from the top of the casting which may be depressed by means of a hand lever 70 mounted on the casting to move the valve to open position, and there is a valve 71 located in the channel 64 whereby flow into pipe 7 is controlled.

Assuming the device to be so constructed, it will be seen that the acetylene gas which is admitted to the torch through the channel 52 in the casting 50, after passing the valve 57, flows through pipe 54, channel 56, into chamber 44, then through channels 59 and 59', pipe 8, channel 11, into chamber 19, then through ports 30, channels 28 into chamber 24 and is discharged from the tip through the channels 25. The oxygen gas which is admitted to the torch through the channel 51, passes through pipe 53, channel 55 into pocket 45, then through channels 60, 61 and 62 into chamber 63. Low pressure oxygen for welding may be admitted by manipulation of valve 71 through channel 64, pipe 7, channel 10, chamber 18, channels 26 into chamber 24 where it mixes with the acetylene gas and is discharged therewith through the channels 25. High pressure oxygen for cutting is admitted as is desired upon the operation of the valve 68, into channel 66 passing through channel 65 into pipe 6 through channel 9, chamber 17, ports 27 and is discharged from the tip through the channels 26' and 26.

The torch construction that we have illustrated in Figs. 5 and 6 is similar to that in the previous figures in so far as the handle end of the device is concerned, but this head end is equipped with a cutting tip 75 which is connected by means of a curved pipe 76 with a tubular shank 77 which is mounted in the same manner and conforms somewhat in construction at its mounting end to the plug 41 in the other type. The tubular member 77 has an enlarged interior explosion chamber 78 which communicates, at one end, with the tip 75 and, at its opposite end, with the pocket 45 by means of channels 60 and 61 formed as previously described. Channels 79 also lead from the chamber 78 into the chamber 44 so that the mixture of gases takes place within the chamber 78.

In the use of such torches, flash back explosions are frequent, and unless provision is made to prevent a flash back flame from following back through the torch to the gas supply pipes, much damage can be caused thereby. The present construction has overcome the possibility of such damage by the construction of the plug 41 and the disposition of the channels 60 and 61 therein. It will be noted that, since there is no direct passage of the oxygen gas through the pocket 25 an explosion taking place in either of the pipes 6 or 7 would have less resistance outwardly than inwardly and consequently its force would be expended outwardly.

We claim—

In a torch of the character described, a handle member having a casting at one end thereof provided with an outer end socket; said socket having shoulders formed interiorly thereof and terminating at its inner end in a pocket, and channels in said casting, through which gas may be directed, opening into the base of said pocket and into the socket between said shoulders, a torch member threaded into said socket having a bore in the end thereof and having channels leading from the base of said bore through which gas can be directed to the torch tip, and a plug having one end fitted within said bore and its opposite end extended into said socket and provided with shoulders engageable with said socket shoulders forming an annular chamber about the plug, and having a reduced end extending into said pocket; said reduced end having a transverse channel therethrough, and said plug having longitudinal channels therein opening into the channels of the torch member and at their opposite ends into the annular chamber about the plug and the transverse channel at the end thereof.

Signed at San Francisco, Cal., this 7th day of October, 1921.

THOMAS A. ERRETT.
WILLIAM P. BROWN.
HUGH F. BROWN.